United States Patent [19]

Vahabzadeh

[11] Patent Number: 4,608,031

[45] Date of Patent: Aug. 26, 1986

[54] CONTROL SYSTEM FOR A CONTINUOUSLY VARIABLE TRANSMISSION

[75] Inventor: Hamid Vahabzadeh, Rochester Hills, Mich.

[73] Assignee: General Motors Corporation, Detroit, Mich.

[21] Appl. No.: 737,288

[22] Filed: May 23, 1985

[51] Int. Cl.[4] ............................................. F16H 11/06
[52] U.S. Cl. ........................................ 474/17; 474/28; 74/689
[58] Field of Search ............... 474/17, 23, 28; 74/689, 74/868

[56] References Cited

U.S. PATENT DOCUMENTS

| | | | |
|---|---|---|---|
| 3,082,636 | 3/1963 | Steinlein | 474/17 |
| 3,670,594 | 6/1972 | Roper | 74/689 |
| 4,261,213 | 4/1981 | Rattunde | 74/196 |
| 4,502,353 | 3/1985 | Beaudoin | 74/689 X |

Primary Examiner—James A. Leppink
Assistant Examiner—Frank McKenzie
Attorney, Agent, or Firm—Donald F. Scherer

[57] ABSTRACT

A hydraulic control for a continuously variable pulley type transmission, has a torque sensing mechanism which is responsive to the torque transmitted by a gearing arrangement drivingly connected with the variable pulley drive. The torque sensing mechanism controls a valve which supplies a pressure signal to a control valve for the variable pulley drive. The control valve in response to the pressure signal and a position signal from the variable pulley drive controls the flow of pressure fluid to and from a hydraulic control mechanism. The hydraulic control mechanism controls the torque capacity of the variable pulley drive.

3 Claims, 1 Drawing Figure

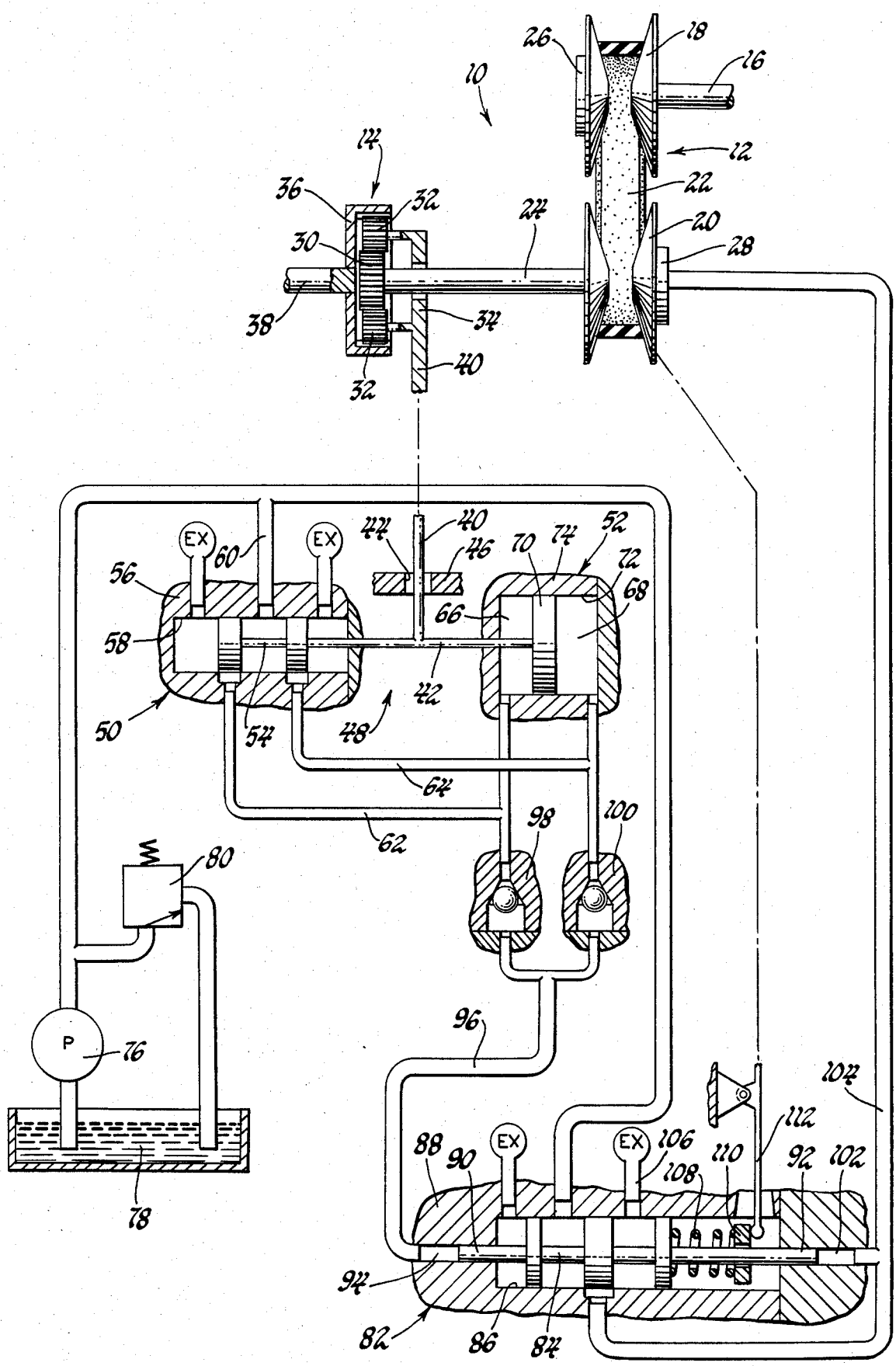

4,608,031

CONTROL SYSTEM FOR A CONTINUOUSLY VARIABLE TRANSMISSION

BACKGROUND OF THE INVENTION

This invention relates to hydraulic controls and more particularly to torque sensitive hydraulic controls for variable ratio pulley drives.

It is known in the prior art transmission controls to use the torque transmitted as a control signal source for a valve member. The prior art mechanisms utilizing a torque signal have generally taken two forms, either the use of twisting deformation along the axis of a rotating shaft member or axial displacement along the axis of a rotating shaft member. Both of these forms can provide a signal indicating the amount of torque transmitted.

In the systems using deformation along the axis of a shaft, it is necessary to provide very accurate tolerance control during manufacture so that repeatability from system to system is available. In the axial displacement systems, the axial dimension along one of the drive axes must be sufficient to house the sensing mechanism and the valve mechanism. In such systems, the sensing mechanism is generally a ball and cam. In both systems, it is necessary to provide rotary seals since the valve mechanisms used therein are generally rotatable with the torque sensor or have fluid transmitted through the shaft on which the torque sensor is mounted.

SUMMARY OF THE INVENTION

The present invention conserves axial space in the drive arrangement and reduces manufacturing tolerances by utilizing the transmission gear arrangement as a torque signal source for the torque sensor. The valving can be spaced from the rotary axis of the gearing in a stationary housing. Since the valve members are not disposed within a rotating mechanism, rotary seals are not needed.

It is therefore an object of this invention to provide an improved hydraulic control for a hydraulically adjustable pulley drive and a gearing transmission, wherein the torque transmitted by the gearing is imposed on a valve mechanism as a control signal so that the valve mechanism will operate to cause the pressure signal to be distributed to a control valve which directs fluid pressure to the hydraulic adjustment mechanism for the drive pulley to thereby establish the torque capacity in the drive pulley portion of the transmission.

It is a further object of this invention to provide an improved hydraulic control for a continuously variable ratio pulley and gearing transmission, wherein the hydraulic control has a torque control valve for providing a pressure signal to the pulley mechaism for controlling the torque capacity thereof and a torque responsive control valve for supplying a control signal to the torque control valve in response to the torque transmitted by the gearing.

It is another object of this invention to provide an improved hydraulic control for a continuously variable ratio pulley and gearing transmission wherein the hydraulic control includes a control valve operable to provide a control pressure to the pulley mechanism and a torque responsive control valve operable to supply a control signal to the control valve and wherein the control valve has imposed thereon a pulley ratio signal in opposition to the torque signal and the torque responsive control valve includes a mechanical connection with the gearing portion of the transmission and a hydraulically operated servo.

These and other objects and advantages of the present invention will be more apparent from the following description and drawing.

DESCRIPTION OF THE DRAWING

The drawing is a diagrammatic representation of a control system and transmission mechanism.

DESCRIPTION OF THE PREFERRED EMBODIMENT

The drawing depicts a continuously variable power transmission generally designated 10 which includes a variable ratio pulley mechanism 12 and a gearing arrangement 14. The variable ratio pulley mechanism 12 includes an input shaft 16, a variable or adjustable input pulley 18, a variable or adjustable output pulley 20, a continuous belt member 22 and a pulley output shaft 24.

The variable pulleys 18 and 20 include conventional control mechanisms 26 and 28, respectively. The control mechanism 28 is a hydraulically operated control mechanism and the conntrol mechanism 26 can be either a hydraulic or mechanical control mechanism. The pressure in control mechanism must be sufficient to establish the torque capacity of the pulley mechanism 12 at a level equal to or greater than the torque required at the pulley output shaft 24. These types of drive systems and controls therefore are well-known.

The pulley output shaft 24 is drivingly connected to a sun gear 30 which is a component of the gearing arrangement 14. The gearing arrangement 14 further includes a plurality of pinion gears 32 rotatably mounted on a carrier 34 and meshing with the sun gear 30. A ring gear 36 is also included in the gearing arrangement 14. The ring gear 36 is disposed in meshing relation with the pinions 32 and is drivingly connected with a transmission output shaft 38.

As is well-known in gearing arrangements such as 14, when torque is transmitted from the sun gear 30 to the ring gear 36, a reaction torque is absorbed by the carrier member 34. In the present arrangement, the carrier 34 has a rod extension portion 40 which is connected with a valve control rod 42. The valve control rod 42 has been rotated 90° out of its operable position to provide simplicity in the drawing. The extension rod 40 passes through an opening 44 formed in the housing 46. The sidewalls of the opening 44 will absorb the reaction torque of the carrier 34 if the movement of the rod 40 is excessive.

The rod 42 is a component in a torque responsive control valve mechanism, generally designated 48, which includes a torque responsive control valve 50 and a servo motor 52. The torque responsive control valve 50 has a valve spool 54 operatively connected with the rod 42 and a valve housing 56 in which is formed a valve bore 58. The valve bore 58 is in fluid communication with a main pressure passage 60 and with two torque signal passages 62 and 64. The valve spool 54 is slidably disposed in the valve bore 58 to control fluid communication between passage 60 and passages 62 and 64, and between passages 62 and 64 and exhaust passages.

The torque signal passages 62 and 64 are connected to the servo motor 52 at chambers 66 and 68, respectively. The servo motor 52 includes a piston 70 slidably disposed in a cylinder 72 formed in a housing 74. The piston 70 cooperates with the housing 74 to form the chambers 66 and 68. The piston 70 is operatively connected with the rod 42.

The main pressure passage 60 receives fluid from a conventional pump or pressure source 76 which draws fluid from a reservoir 78. The pressure level in the main pressure passage 60 is controlled by a conventional system pressure regulator 80. The pressure regulator 80 may be of a single pressure level type or a variable pressure level type. Both types of pressure regulator valves are known. The main pressure passage 60 is in fluid communication with a torque control valve, generally designated 82.

The torque control valve 82 includes a valve spool 84 slidably disposed in a bore 86 formed in a housing 88. The valve spool 84 has integrally formed therewith, or otherwise operatively connected thereto, a pair of pistons 90 and 92. The piston 90 is slidably disposed in a bore 94 which is in fluid communication with a torque signal passage 96. The torque signal passage 96 is connected through a pair of check valves 98 and 100 which are in fluid communication with passages 62 and 64, respectively. Therefore, the higher of the pressure levels in passages 62 or 64 will be transmitted through the respective check valves 98 and 100 to passage 96. This pressure signal will operate on the end of piston 90 thereby imposing a rightward force on the valve spool 84.

The piston 92 is slidably disposed in a bore 102 which is in fluid communication with a torque control passage 104 which is connected between bore 86 and the hydraulic control mechanism 28. The pressure in passage 104 is variably controlled between the pressure in the main pressure passage 60 and the pressure in an exhaust passage 106. An increase in the pressure in passage 104 results in an increased torque capacity in the belt drive mechanism 20 and vice versa.

The pressure in bore 102 operates on piston 92 to impose a leftward force on the valve spool 84. The valve spool 84 also have a leftward force imposed thereon from a spring member 108 which is compressed between the valve spool 84 and a spring seat 110. The spring seat 110 is controlled by a rod 112 which is responsive to the axial position of the axially movable pulley portion of pulley 20.

As is well-known in variable ratio pulley drives, the axial position of one of the axially movable pulley members is proportional to the drive ratio between the pulleys. Therefore, the positioning of spring seat 110 will provide a control signal which is proportional to the drive ratio in the variable pulley mechanism 12.

When torque is transmitted through the pulley mechanism 12 and the gearing arrangement 14, the carrier 34 will attempt to rotate thereby causing control rod 42 to ove rightward or leftward as viewed in the drawing. Movement of the rod 42 will result in movement of control valve 54 such that fluid communication between the main pressure passage 60 and either passage 62 or 64 will be accomplished. For purposes of further discussion, it will be assumed that valve spool 54 moves leftward and therefore passage 62 is pressurized while passage 64 is exhausted.

The pressure in passage 62 is communicated to chamber 66 and through check valve 98 to passage 96. When the pressure in valve 66 is sufficient to overcome the force on rod 42 (i.e., the reaction torque on carrier 34) which caused leftward movement, the rod 42 and valve spool 54 will be returned to the neutral position shown. Thus, the pressure in passage 62 is proportional to the reaction torque on carrier 34. The pressure in passage 96 will provide a torque signal to the torque control valve 82 through piston 90 such that righward movement of the valve spool 84 will occur. This movement of valve spool 84 will result in fluid communication between main pressure passage 60 and control passage 104. The pressure in control passage 104 will operate on the hydraulic control mechanism 28 to change the torque capacity within the pulley mechanism 12.

The pressure in control passage 104 will also operate on piston 92 to impose a counterbalancing force in opposition to the torque signal imposed on piston 90. Axial movement of the movable pulley of variable pulley 20 will result in a change in the force of spring 108. As the belt 22 moves radially outward on variable pulleys, the force in spring 108 will decrease requiring a higher pressure in passage 104 in response to a given torque signal. The pressure in passage 104 and bore 102 will change until a new force balance on the valve 84 occurs, at which time the valve 84 will be returned to the neutral position shown. The piston 90 and bore 94 can be designed to permit a controlled leakage such that continuous fluid flow will be necessary to maintain the torque signal.

In the alternative, a fixed restriction for controlling leakage from passage 96 can be provided. Since such a leakage arrangement will require a continuous fluid flow, the valve spool 54 will not return to a neutral position but will slightly open to provide the required make-up fluid flow. The same action is provided for valve spool 84, that is, the pressure in chamber 102 will not be fully sealed from exhaust.

If the vehicle being driven by the transmission 10 should encounter a downgrade, the reaction torque on carrier 34 will be reduced. A torque reduction at carrier 34 will also occur if the operator should decrease the fuel feed. When the reaction torque on carrier 34 is reduced, the pressure in chamber 66 will cause the piston 70 and valve 54 to move rightward, reducing the pressure in passage 62 so that the torque signal on the torque control valve 82 will be reduced. This will result in a reduction in the pressure in the torque control passage 104.

From the above description of the operation, it should be appreciated that the torque capacity within the transmission 10 is controlled in part by the torque being transmitted through the pulley drive mechanism. It should also be apparent that with the system as described, the valve mechanisms 50 and 82 will not require the provision for rotating seal members.

Also, the axial dimensioning of the pulleys 18 and 20 will not require space for the valve mechanisms utilized by prior art systems. The carrier 34 is a conventional gearing member and does not increase the axial size of the gearing arrangement 14. Since the movement of the carrier 34 in response to torque transmission is rotary rather than axial, axial space does not have to be provided to accommodate this signal.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A hydraulic control for a continuously variable transmission having hydraulically adjustable axially movable pulley members and a gearing arrangement for the transmitting of torque between an input shaft and an output shaft, said control comprising; a source of fluid pressure; first valve means connected with said source and being operable to supply control fluid to one of said adjustable pulley members, said control fluid operating on said first valve means to impose a force thereon; feedback means for imposing a force proportional to the axial position of said one adjustable pulley member on said first valve means in addition to said control fluid imposed force; torque sensing means operatively connected with said gearing arrangement for transmitting a force proportional to the torque transmitted by said gearing arrangement; servo motor means operatively connected with said torque sensing means; second valve means connected with said torque sensing means and being operable on a change of torque transmission to distribute a pressure signal from said source to said servo motor means and said servo motor means being responsive to said pressure fluid to balance the force on said torque to balance the force on said torque sensing means and discontinue fluid distribution thereto; and means for directing the pressure signal from said second valve means to said first valve means.

2. A hydraulic control for a continuously variable transmission having hydraulically adjustable axially movable pulley members and a gearing arrangement for the transmitting of torque between an input shaft and an output shaft, said control comprising; a source of fluid pressure; first valve means connected with said source and being operable to supply control fluid to one of said adjustable pulley members, said control fluid operating on said first valve means to impose a force thereon; feedback means for imposing a force proportional to the axial position of said one adjustable pulley member on said first valve means in addition to said control fluid imposed force; torque sensing means operatively connected with said gearing arrangement for transmitting a force proportional to the torque transmitted by said gearing arrangement; servo motor means operatively connected with said torque sensig means; second valve means connected with said torque sensing means and being operable on a change of torque transmission to distribute pressure fluid from said source to said servo motor means and said servo motor means being responsive to said pressure fluid to balance the force on said torque to balance the force on said torque sensing means and discontinue fluid distribution thereto; and check valve means for distributing the pressure fluid at said servo motor means to said first valve means to counteract the forces imposed by said feedback means and by said control fluid.

3. A hydraulic control for a continuously variable transmission having hydraulically adjustable axially movable pulley members and a gearing arrangement for the transmitting of torque between an input shaft and an output shaft, said control comprising; a source of fluid pressure; torque control valve means connected with said source and being operable to supply pressurized control fluid to one of said adjustable pulley members to establish the torque capacity thereof, said control fluid operating on said torque control valve means to impose a force thereon; feedback means for imposing a force proportional to the axial position of said one adjustable pulley member on said torque control valve means in addition to said control fluid imposed force; torque sensing means operatively connected with said gearing arrangement for transmitting a force proportional to the torque transmitted by said gearing arrangement; servo motor means operatively connected with said torque sensing means; torque signal valve means connected with said torque sensing means and being operable on a change of torque transmission to distribute pressure fluid from said source to said servo motor means and said servo motor means being responsive to said pressure fluid to balance the force on said torque to balance the force on said torque sensing means and move said torque sensing valve means to discontinue fluid distribution thereto; and means for distributing the pressure fluid at said servo motor means to said torque control valve means to cause the torque control valve means to effect a change in the pressure level of the pressurized control fluid and thereby change the torque capacity of the transmission, said pressure fluid being operable to counteract the forces imposed by said feedback means and by said control fluid.

* * * * *